May 29, 1951 — I. D. WALLACH ET AL — 2,555,214
METHOD OF PRODUCING GLASS RAZOR
BLADES AND PRODUCT THEREOF
Filed Feb. 4, 1948
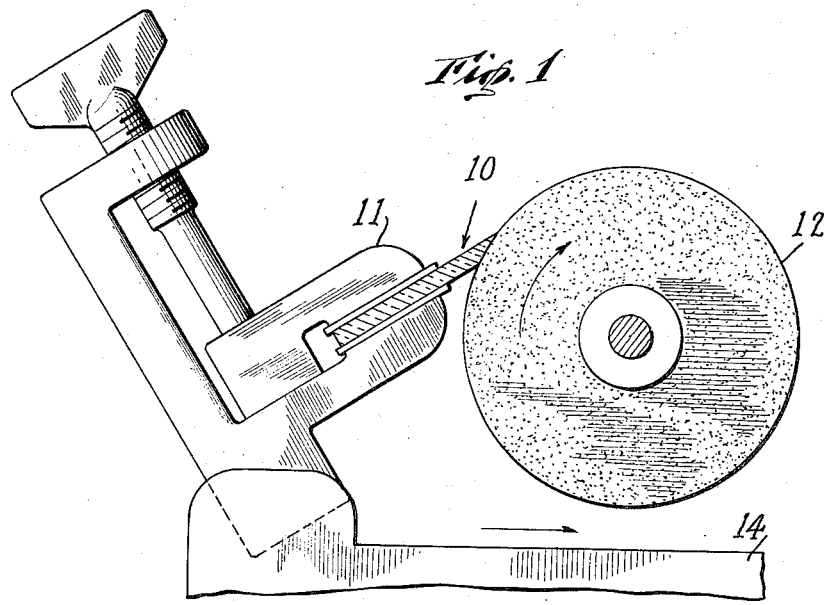
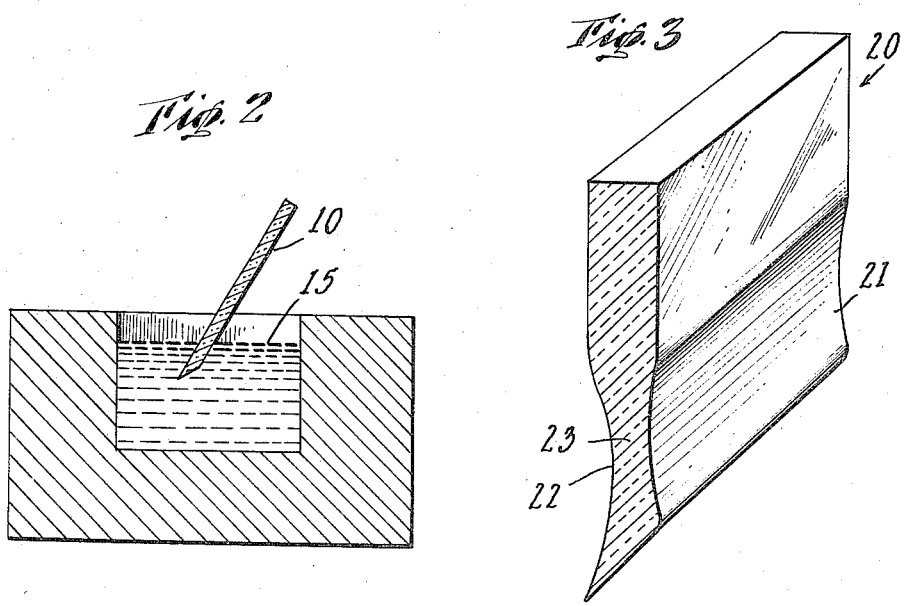
INVENTORS
Irving D. Wallach
Emil C. Joost
BY
Duell and Kane
ATTORNEYS Patented May 29, 1951

2,555,214

UNITED STATES PATENT OFFICE 2,555,214

METHOD OF PRODUCING GLASS RAZOR BLADES AND PRODUCT THEREOF

Irving D. Wallach, Port Washington, and Emil C. Joost, Springfield Gardens, N. Y., assignors to Associated Development & Research Corporation, New York, N. Y., a corporation of New York Application February 4, 1948, Serial No. 6,136

6 Claims. (Cl. 41—42)

This invention relates to an improved method for making razor blades and the like from glass, and to the product thereof.

In previous attempts to produce a keen, uniform, cutting edge on a glass blank or the like it has been difficult to prevent the edge from breaking down or chipping during the final grinding and honing. We have found, however, that glass blades of superior keenness and edge holding quality may be economically produced by grinding a fine edge on a glass blank using a relatively rough stone, and then subjecting the edge portion of the blank to a series of short dips in an etching bath, following each dip with rinsing or cleansing.

The resulting edge when viewed under suitable magnification is fine and regular and exhibits little of the roughness and irregularity noticeable even in the best commercial steel blades. The etching treatment, in addition to completing the sharpening of the edge piece, improves the structure of the blade in the area above the cutting edge by forming shallow channels which provide clearance between the blade and its holder and make it easier to clean the holder and the thereon mounted blade after shaving.

It is an object of our invention, therefore, to provide an improved non-metallic razor blade.

It is another object of our invention to provide an improved method for producing an edge of razor keenness on a glass blank or the like.

In the accompanying drawings:

Fig. 1 is a somewhat schematic representation of the preliminary grinding operation;

Fig. 2 is a schematic representation of the acid etching step; and

Fig. 3 is an enlarged and foreshortened perspective of the final blade.

Referring now to Fig. 1 a blank 10 of glass of suitable composition is clamped within a vise 11 or the like for suitable support relative to the grinding wheel 12. The apparatus in which the grinding is carried out may be similar to a milling machine, in which the carriage 14 mounting the clamping means moves at a controlled speed relative to the grinding wheel to advance the blank 10 continuously until the grinding is completed. Preferably, the wheel rotates away from the edge, as indicated by the arrow. As will be understood the illustration of Fig. 1 is somewhat schematic and any desired mechanism of an automatic or semi-automatic character might be employed to achieve the steps therein exemplified.

We have found that the most suitable blanks for use in our process, as respect to size, thickness, and quality of glass, are similar to high quality microscope slides. These blanks have a uniform thickness of .040″ and appear to have a relatively high lime content. The most suitable grinding wheel is known in the trade as a No. 80 grit; such a wheel grinds to proper fineness and does not fill up quickly with particles removed from the blank during grinding. The blank is ground to a fine edge under continuous water lubrication. We have found that the included angle of the edge should be about 30 degrees for optimum results.

The grinding is carried out to substantially the ultimate stage of keenness. There will be some pitting or flaking of the blades at the edge during the grinding operation and the ground blank, after being thoroughly washed in hot water, is subjected to an acid etching treatment. No honing or additional sharpening is thereafter required.

Fig. 2 is a purely schematic representation showing the ground blank 10 immersed to a suitable depth in a shallow bath 15 of concentrated hydrofluoric acid at normal room temperature, for example, 68 to 72 degrees F. The acid concentration should be not less than 52 per cent; we have found that a weaker acid results in "pocking" the blade at the edge thereof. The blank is held in the acid in an inclined position, as indicated in Fig. 2. The actual angle does not appear to be critical except that the results become increasingly less satisfactory when the departure of the blade from the vertical exceeds 35 degrees. A 30 degree angle appears to produce the best results, although satisfactory edges have been formed at various angles of inclination ranging from 0 degree to 35 degrees.

The blank is maintained in the acid bath for preferably not more than five seconds and after each immersion it is rinsed in a preferably flowing water bath at a temperature of from 180 to 200 degrees F. From 10 to 15 acid dips, each dip being followed by a washing step, will produce a blade having an edge of excellent keenness and smoothness. It should be noted that we have found it most desirable to wipe the blank dry, using cloth or other suitable means, following the first two washings. There appears to be an outer hard film on the glass blank which breaks down during the first two acid treatments and which appears as a powdery layer on the glass blank. After the second wiping, however, this powdery film does not reappear and the blank may be air dried after each subsequent washing operation.

The blank is not immersed in the acid much above the root of the edge. In this respect Fig. 2 somewhat exaggerates the depth of immersion. We have found, however, that due to the acid fumes, or perhaps the upward capillary movement or meniscus effect of the acid along the surface of the blank, the blank is hollowed at each of its faces above the edge line as shown in Fig. 3.

In Fig. 3, the completed blade 20 is shown in enlarged perspective, and somewhat shorter than a typical razor blade. The front and rear surfaces have shallow channels, respectively 21 and 22, resulting from the previously noted acid action. The channels extend to about one half of the height of the blade. The resultant neck 23 provides a desirable degree of flexibility, and the channel 22, which will be adjacent the head of the blade holder during shaving, provides additional clearance and makes it possible, for example, completely to clean the edge by holding the same beneath a faucet or by swishing it through a basin of water.

Thus, among others, the several objects of the invention as afore noted are achieved. Obviously numerous changes in construction and rearrangement of the parts might be resorted to without departing from the spirit of the invention as defined by the claims. Also the steps of the method might be varied without departing from the invention.

We claim:

1. The method of manufacturing a razor blade from a glass blank, comprising grinding an edge of said blank to substantially ultimate keenness and thereafter subjecting said blank to a succession of immersions of substantially five seconds' duration in an etching bath of hydrofluoric acid having a 52% concentration, the blank being immersed in said bath to a depth slightly above the root of the edge and held at an angle of not more than 35 degrees from the vertical during each immersion, each said immersion being followed by washing in hot water, and said blank being wiped dry after each of the first two washing steps.

2. The method of making a razor blade from a glass blank, comprising forming a keen edge on said blank and then subjecting said blank to a series of from ten to fifteen immersions of about five seconds each in a bath of concentrated hydrofluoric acid, the depth of immersion being slightly beyond the base of the edge, and each immersion being followed by a wash in water having a temperature of the order of 180 degrees Fahrenheit.

3. The method of manufacturing a razor blade from a glass blank, comprising grinding an edge of said blank to substantially ultimate keenness, immediately thereafter washing said blank in water of a temperature about 180 degrees F., and then subjecting said edge to a succession of relatively short immersions in an etching bath, each said immersion being followed by a wash in hot water to remove residual etching material.

4. The method of manufacturing a razor blade from a glass blank, comprising grinding an edge of said blank to substantially ultimate keenness and then subjecting said blank to a succession of relatively short immersions in an etching bath, the depth of each said immersion being to a level slightly above the base of said edge and said blank being held at an acute angle relative to the vertical during immersion; and each said immersion being followed by a wash to remove the etching material.

5. The method of manufacturing a razor blade from a glass blank, comprising grinding a keen edge on said blank and thereafter subjecting said edge to not less than 10 nor more than 15 immersions in an etching bath, each said immersion being of the order of five seconds' duration and each immersion being followed by a wash to remove the etching material.

6. A method of manufacturing a razor blade from a glass blank which includes grinding a keen edge on said blank, the surface of such edge extending at an angle of substantially 30° to the blank axis and such grinding occurring in the presence of a suitable liquid, thereafter subjecting such edge portion to an acid etching action by immersing the blank in the acid to a suitable depth and simultaneously causing said acid to act on portions of said blade blank beyond the edge of the same to reduce the thickness of said blank and thus incorporate a substantially flexible neck in the same.

IRVING D. WALLACH.
EMIL C. JOOST.

REFERENCES CITED

The following references are of record in the file of this patent:

UNITED STATES PATENTS

| Number | Name | Date |
| --- | --- | --- |
| 230,137 | Lapham | July 20, 1880 |
| 2,262,588 | Mailman | Nov. 11, 1941 |
| 2,238,008 | Beck | Apr. 8, 1941 |
| 2,434,286 | Pfann | Jan. 13, 1948 |

FOREIGN PATENTS

| Number | Country | Date |
| --- | --- | --- |
| 364,927 | Great Britain | Jan. 14, 1932 |
| 677,334 | France | Dec. 9, 1929 |